June 28, 1966

R. F. WILEY 3,258,321

TUBULATED HOLLOW ARTICLE FORMING AND MOLDING
APPARATUS THEREFOR

Filed June 29, 1962

INVENTOR.
ROBERT F. WILEY
BY Clarence R. Patty, Jr.
ATTORNEY

June 28, 1966 R. F. WILEY 3,258,321
TUBULATED HOLLOW ARTICLE FORMING AND MOLDING
APPARATUS THEREFOR
Filed June 29, 1962 2 Sheets-Sheet 2

INVENTOR.
ROBERT F. WILEY
BY Clarence R. Patty, J.
ATTORNEY

United States Patent Office 3,258,321
Patented June 28, 1966

3,258,321
TUBULATED HOLLOW ARTICLE FORMING AND MOLDING APPARATUS THEREFOR
Robert F. Wiley, Corning, N.Y., assignor to Corning Glass Works, Corning, N.Y., a corporation of New York
Filed June 29, 1962, Ser. No. 206,478
2 Claims. (Cl. 65—78)

The present invention relates to a method of and apparatus for making tubulated funnel shaped hollow glass articles, such for example as those extensively employed in the manufacture of cathode ray tube envelopes embodied in color television tubes, although obviously not limited to such use.

Desirably such articles are formed in such a fashion that their walls at their large ends embody a relatively wide flat annular surface to make them readily sealable in known manner, by frit sealing glass or the like, to a face plate.

According to the invention, a hollow mold is provided having the necessary configuration for press forming therein, from a molten charge of glass, an article having its large top end in finished form ready for sealing to a complementary part. Additionally, the bottom of such mold embodies an axially disposed depending tubular portion closed by an axially lowerable sleeve whose bore is closed by an axially lowerable valve whose top end terminates well below the top end of such sleeve, whereby an article pressed in such mold has a dependent cylindrical protuberance formed thereon. After pressing such an article, the valve and sleeve are lowered to enable the surfaces engaged by them to reheat from within while a heater substituted for the plunger directs heat into the interior region of the pressed article from which the protuberance depends for a sufficient time to neutralize surface chilling thereof caused by the plunger and to promote elongation of such protuberance by the action of gravity. The sleeve is then elevated to its initial position and the article protuberance is then elongated and tubulated by withdrawing air from the confined space between the valve and the protuberance via a suitable passage through the valve and by creating pressure within the article to blow the protuberance into tubular form. Removal of the article from the mold is conveniently effected pneumatically by connecting a positive pressure air supply line to the valve passage or by elevation of the valve to its initial position.

For a more detailed description of the invention, reference is made to the accompanying drawing wherein:

FIG. 1 illustrates, in sectional elevation, a mold embodying the invention containing a hollow article having a bottom protuberance pressed therein by a conventional form of plunger and ring still in engagement therewith, the bore of the tubular portion of such mold containing an axially movable sleeve and the bore of the sleeve containing an axially movable valve. The figure also shows means for axially moving such sleeve and valve and for passing air through the valve.

Figure 1:
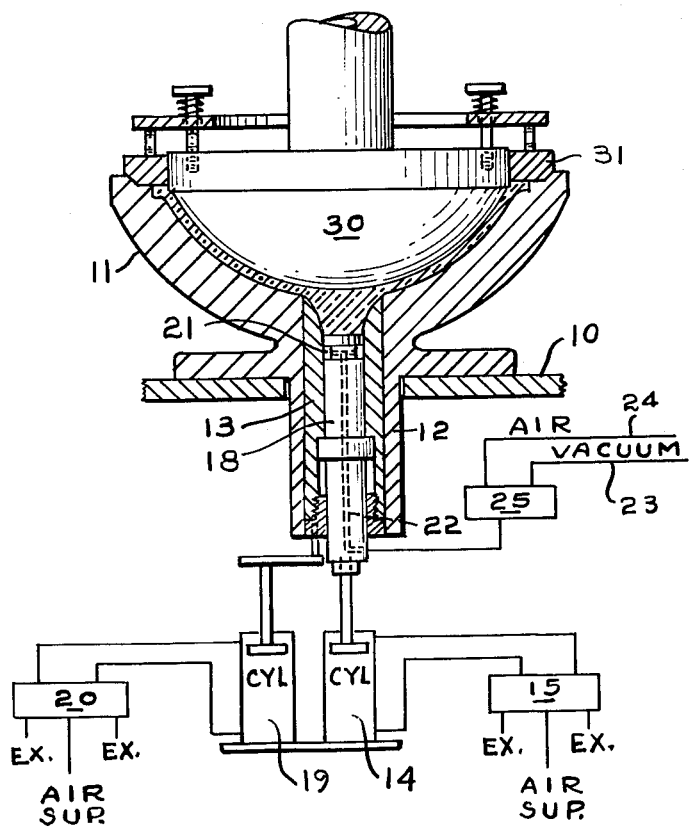

Referring to the drawing in detail, arranged on a suitable support 10 is a mold 11, which at the top may be of conventional circular, rectangular or any other desired configuration, and at its bottom is provided with an axially located tubular portion 12 whose bore is occupied by a sleeve 13 axially movable in the bore of tubular portion 12, as by a fluid cylinder 14 by fluid supplied from a conventional fluid feed valve 15. The bore of sleeve 13 is closed by a valve 18 axially movable in the bore of sleeve 13, as by a fluid cylinder 19 by fluid supplied to it by a conventional feed valve 20.

As will be observed valve 18 at its top end has an annular groove 21 thereabout connected to an axial passage 22 therethrough and which is connectible to vacuum and positive pressure fluid supply lines 23 and 24, respectively, via a conventional feed valve 25.

As shown, a conventional plunger 30 and spring plate 31, a spot heater 33, or a blowhead 35 may be associated with mold 11.

As illustrated in FIG. 1, with the valve 18 and sleeve 13 in their uppermost positions, a charge of glass deposited in mold 11 is pressed in the form shown in FIG. 1 by plunger 30 into engagement with the spring plate 31 and down into that portion of the sleeve 13 above valve 18.

Figure 2:
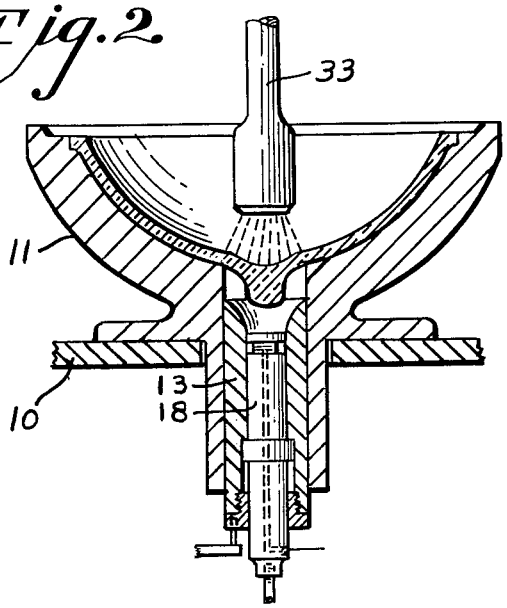
FIG. 2 is a view of the mold and article of FIG. 1, but with the plunger replaced with a heater unit and with the axially movable sleeve and valve embodied in the mold in their lowered positions.

As illustrated in FIG. 2, the sleeve 13 and valve 18 are next lowered and with the plunger 30 disassociated from the mold and replaced with the spot heater 33 arranged to direct heat into the protuberance region of the pressed blank.

Figure 3:
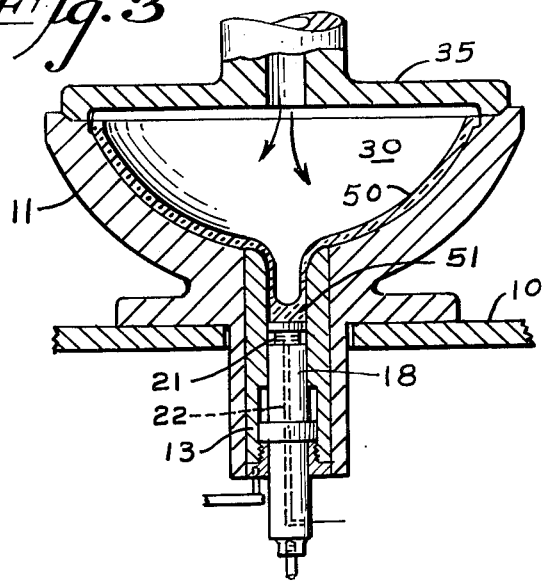
FIG. 3 is a view, similar to FIG. 2, with the heater unit replaced by a blowhead closing the top entrance into the article, with the sleeve restored to its initial position and the article protuberance attenuated to its final form.

As illustrated in FIG. 3, the spot heater has been replaced by the blowhead 35, the sleeve 13 has been elevated to its initial position and blowing air directed into the blank to form the article 50, such formation being in part effected by withdrawing air from the space above the lowered valve 18 through valve 25 to bring the tubular portion 51 so formed into engagement with the top of valve 18.

As previously mentioned, removal of article 50 from the mold may be effected by elevating the valve 18 to its initial position or by substituting connection of the positive pressure supply line 24 connection to such valve for the vacuum line connection thereto.

What is claimed is:
1. The method of forming a tubulated hollow glass article to be used as the funnel portion of a cathode ray tube envelope, which comprises; imparting a preliminary form for said glass article to a charge of molten glass by pressing such charge in a funnel-shaped mold having an upper main hollow portion corresponding to the main body portion of said article, the bottom of such mold embodying an axially disposed depending tubular portion for receipt of said glass and incorporating an axially lowerable sleeve whose bore embodies an axially lowerable valve which has its top end terminating below the top end of such sleeve and closes the sleeve; thereafter lowering said sleeve and valve to provide a confined tubular space between such elements and the portion of the glass pressed into said tubular portion of the mold, permitting elongation of said portion of the glass into said space to preliminarily form a protuberance on said article; and elevating said sleeve to its initial position and subjecting said preliminarily formed protuberance, in its region extending transversely of the bore of said tubular portion of the mold, to differential pressure to further elongate and impart tubular form to the protuberance.

2. A hollow mold in which a charge of glass may be pressed into the funnel part for a cathode ray tube envelope, such funnel part including a tubulated protuberance, and said mold having a wall embodying a tubular portion whose bore passes through such wall and is located on the wall so as to correspond to said protuberance; a closure for the bore of said tubular portion of said mold wall and comprising an axially movable sleeve whose bore embodies an axially movable valve which has its top end terminating below the top end of such sleeve; and means for axially moving said sleeve and valve within their respectively associated bores, whereby the sleeve and valve may be moved to disengage them from a funnel part pressed in such mold to enable redistribution of the heat within the protuberance of such part, the sleeve may then be restored alone to re-engage said funnel part, and said protuberance elongated and tubular from imparted thereto by application of differential pressure to opposite ends thereof.

References Cited by the Examiner

UNITED STATES PATENTS

| | | | |
|---|---|---|---|
| 832,212 | 10/1906 | Ripley | 65—64 |
| 1,235,008 | 7/1917 | Canfield | 65—79 |
| 2,063,463 | 12/1936 | Rowe | 65—234 X |
| 2,886,920 | 5/1959 | Breadner et al. | 65—108 |

FOREIGN PATENTS 815,548  6/1959  Great Britain.

DONALL H. SYLVESTER, *Primary Examiner.*

HOWARD R. CAINE, *Examiner.*

A. D. KELLOGG, *Assistant Examiner.*